(12) United States Patent
Mikayama et al.

(10) Patent No.: US 10,600,345 B2
(45) Date of Patent: Mar. 24, 2020

(54) LUMINANCE ADJUSTMENT SYSTEM, DISPLAY SYSTEM, MOVING BODY, AND LUMINANCE ADJUSTMENT METHOD

(71) Applicant: Panasonic Intellectual Property Management Co., Ltd., Osaka (JP)

(72) Inventors: Satoshi Mikayama, Kanagawa (JP); Yuta Taguchi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/135,495

(22) Filed: Sep. 19, 2018

(65) Prior Publication Data

US 2019/0101752 A1 Apr. 4, 2019

(30) Foreign Application Priority Data

Sep. 29, 2017 (JP) ................................. 2017-191894

(51) Int. Cl.
*G09G 3/00* (2006.01)
*G02B 27/01* (2006.01)
(Continued)

(52) U.S. Cl.
CPC ......... *G09G 3/002* (2013.01); *G02B 27/0101* (2013.01); *G09G 3/025* (2013.01); *B60K 2370/1529* (2019.05); *G02B 2027/014* (2013.01); *G02B 2027/0118* (2013.01); *G02B 2027/0154* (2013.01); *G02F 1/133* (2013.01); *G09G 2320/0626* (2013.01); *G09G 2320/0653* (2013.01); *G09G 2360/144* (2013.01); *G09G 2380/10* (2013.01)

(58) Field of Classification Search
CPC .......... G09G 2360/144; G09G 3/3406; G09G 2320/0653; G09G 2320/0626
See application file for complete search history.

(56) References Cited

U.S. PATENT DOCUMENTS

| 5,214,413 A | 5/1993 | Okabayashi et al. |
| 2008/0165203 A1* | 7/2008 | Pantfoerder ............. G09G 3/20 345/589 |

(Continued)

FOREIGN PATENT DOCUMENTS

| JP | 64-001632 | 1/1989 |
| JP | 2004-322886 | 11/2004 |

*Primary Examiner* — Sanjiv D. Patel
(74) *Attorney, Agent, or Firm* — Greenblum & Bernstein, P.L.C.

(57) ABSTRACT

A luminance adjustment system adjusts luminance of image display in a display device. The luminance adjustment system includes a controller that changes the luminance in accordance with a value of illuminance in a target space, The controller has, as operation modes, a gradual change mode in which the luminance with respect to the value of illuminance is changed in a first time, and an abrupt change mode in which the luminance with respect to the value of illuminance is changed in a second time being shorter than the first time. The controller makes switching from the gradual change mode to the abrupt change mode with a sign of an abrupt change in illuminance in the target space taken as a trigger, and then operates in the abrupt change mode for at least a fixed time after the switching.

9 Claims, 7 Drawing Sheets

(51) Int. Cl.
*G09G 3/02* (2006.01)
*G02F 1/133* (2006.01)

(56) References Cited

U.S. PATENT DOCUMENTS

| | | | |
|---|---|---|---|
| 2012/0019493 A1* | 1/2012 | Barnhoefer | H05B 33/0851 |
| | | | 345/207 |
| 2013/0328842 A1* | 12/2013 | Barnhoefer | G09G 3/3406 |
| | | | 345/207 |
| 2016/0240167 A1* | 8/2016 | Breazile | G09G 5/10 |
| 2017/0011678 A1* | 1/2017 | Cao | G09G 3/2003 |
| 2019/0011712 A1* | 1/2019 | Nagano | B60K 35/00 |

* cited by examiner

FIG. 6

LUMINANCE ADJUSTMENT SYSTEM, DISPLAY SYSTEM, MOVING BODY, AND LUMINANCE ADJUSTMENT METHOD

The present application claims the benefit of foreign priority of Japanese patent application 2017-191894 filed on Sep. 29, 2017, the contents all of which are incorporated herein by reference.

BACKGROUND

1. Technical Field

The present disclosure generally relates to a luminance adjustment system, a display system, a moving body, and a luminance adjustment method. More specifically, the present disclosure relates to a luminance adjustment system for adjusting luminance of image display in a display device, a display system including the luminance adjustment system and the display device, a moving body including the display system, and a luminance adjustment method.

2. Description of the Related Art

As a conventional example, a display device described in Unexamined Japanese Patent Publication No. 2004-322886 will be illustrated. This display device is a device to be applied to a head-up display (HUD) for a vehicle. The display device includes: a light emission type indicator capable of changing indication brightness; a light detector that outputs a detected value according to brightness of outside light as a detection signal; and a controller that outputs a control luminance value, calculated based on the detected value and an adjustment value, as a control signal to control the indication luminance of the light emission type indicator.

According to Unexamined Japanese Patent Publication No. 2004-322886 above, the controller stores a first detected value, detected by the light detector, and a threshold of the detected value and calculates a target luminance value based on a second detected value newly detected by the light detector. When the first detected value is a value higher in brightness than the threshold and the second detected value is a value lower in brightness than the threshold, a high-speed adjustment value, with which the control luminance value becomes closer to the target luminance value than in normal time, is determined as the adjustment value, and the control luminance value based on the high-speed adjustment value is calculated. Therefore, even when ambient brightness decreases abruptly, it does not require much time for the indication luminance to become favorable, and a state in which the indication is too bright to view can be resolved in a short time.

SUMMARY

The present disclosure provides a luminance adjustment system, a display system, a moving body, and a program, which are capable of further reducing the time required for adjusting display luminance.

A luminance adjustment system according to one aspect of the present disclosure adjusts luminance of image display in a display device. The luminance adjustment system includes a controller that changes the luminance in accordance with a value of illuminance in a target space. The controller has, as operation modes, a gradual change mode in which the luminance with respect to the value of illuminance is changed in a first time, and an abrupt change mode in which the luminance with respect to the value of illuminance is changed in a second time being shorter than the first time. The controller makes switching from the gradual change mode to the abrupt change mode with a sign of an abrupt change in illuminance in the target space taken as a trigger, and then operates in the abrupt change mode for at least a fixed time after the switching.

A display system according to another aspect of the present disclosure includes the luminance adjustment system and the display device.

A moving body according to still another aspect of the present disclosure includes the display system and a reflective member that is caused to project an image of the display device.

A luminance adjustment method according to still another aspect of the present disclosure adjusts luminance of image display in a display device. The luminance adjustment method includes changing the luminance of the image display in accordance with a value of illuminance in a target space. In the changing, operation modes include a gradual change mode in which the luminance with respect to the value of illuminance is changed in a first time, and an abrupt change mode in which the luminance with respect to the value of illuminance is changed in a second time being shorter than the first time. In the changing, with a sign of an abrupt change in illuminance in the target space taken as a trigger, switching is made from the gradual change mode to the abrupt change mode, and operation is then performed in the abrupt change mode for at least a fixed time after the switching.

The present disclosure has an advantage of being able to further reduce the time required for adjusting the display luminance.

DETAILED DESCRIPTION

Prior to description of an exemplary embodiment of the present disclosure, a problem with the conventional technique will be described briefly. In the display device described in Unexamined Japanese Patent Publication No. 2004-322886, in the case of the abrupt decrease in the ambient brightness, a control is performed using a control luminance value based on an adjustment value at and after a time when a high-speed adjustment value is determined as the adjustment value, thereby reducing a time that is taken until an indication luminance becomes favorable. However, a processing routine from detection of a second detected value until determination of the high-speed adjustment value as the adjustment value is the same as a processing routine until determination of the adjustment value in normal time, and hence the time taken until determination of the high-speed adjustment value has not been reduced. Therefore, it is desired to further reduce the time that is taken until the display luminance becomes favorable.

(1) Outline

The following exemplary embodiment is merely one of various exemplary embodiments of the present disclosure. Various modifications can be made in the following exemplary embodiment in accordance with a design or the like so long as the object of the present disclosure can be achieved. FIGS. 1 to 3, 6, and 7 described in the following exemplary embodiment are schematic views and diagrams. Size ratios of constituent elements in FIGS. 1 to 3, 6, and 7 do not necessarily reflect actual dimensional ratios.

Figure 1:
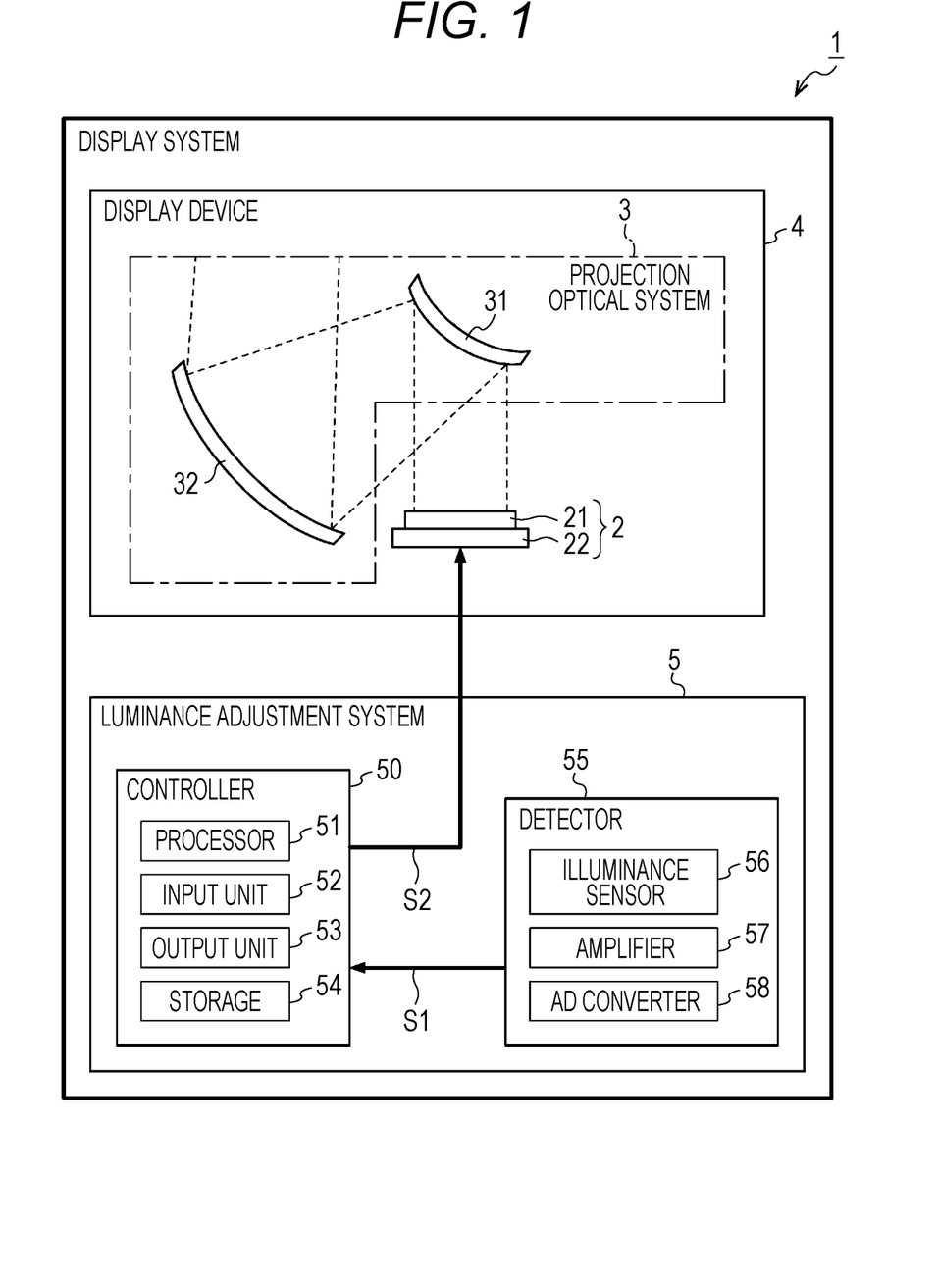
FIG. 1 is a schematic block diagram of a display system according to an exemplary embodiment.

Display system 1 of the present exemplary embodiment includes display device 4 and luminance adjustment system 5 as shown in FIG. 1. Luminance adjustment system 5 of the present exemplary embodiment is a system for adjusting luminance of image display in display device 4. Luminance adjustment system 5 includes controller 50 that changes the luminance of the image display in accordance with a value of illuminance in target space 400 (cf. FIGS. 2 and 3). The "target space" mentioned herein is assumed to be, for example, a space including an area in which an image of display device 4 is formed. However, the target space may not precisely include the image forming area and may be a space including a peripheral area of the image forming area.

Figure 2:
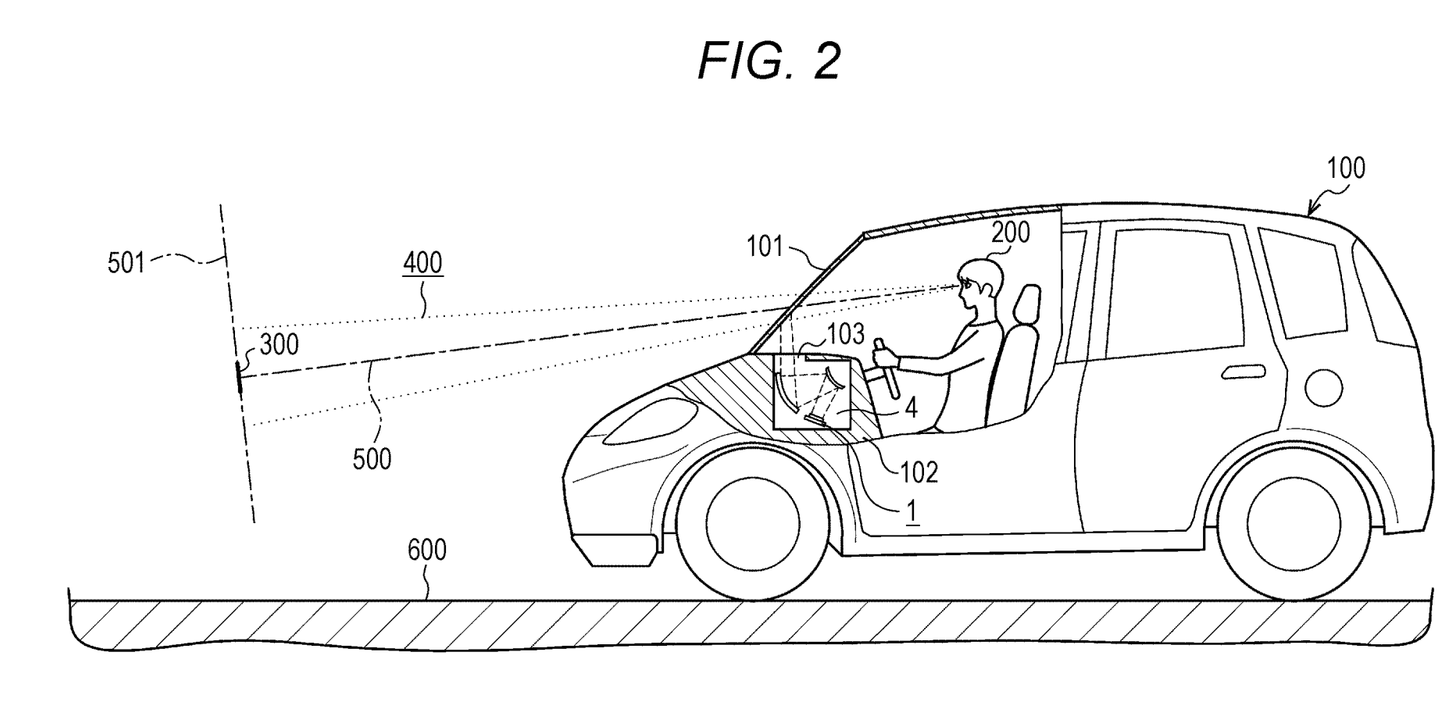
FIG. 2 is a conceptual view of a moving body (vehicle) including the above display system.
Figure 3:
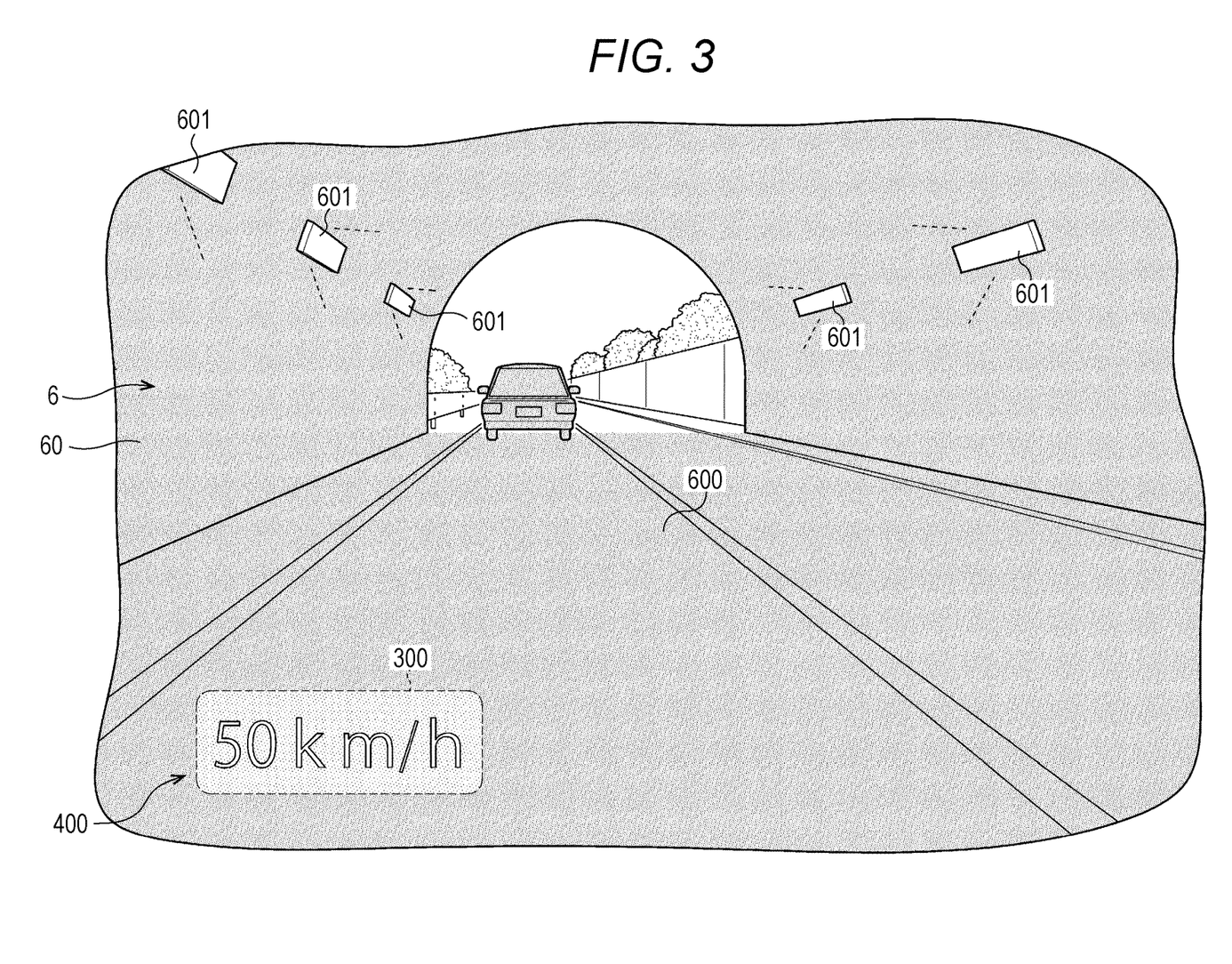
FIG. 3 is a conceptual view showing a field of view of a user during a time when the above moving body (vehicle) is traveling near an exit of a tunnel.
Figure 7:
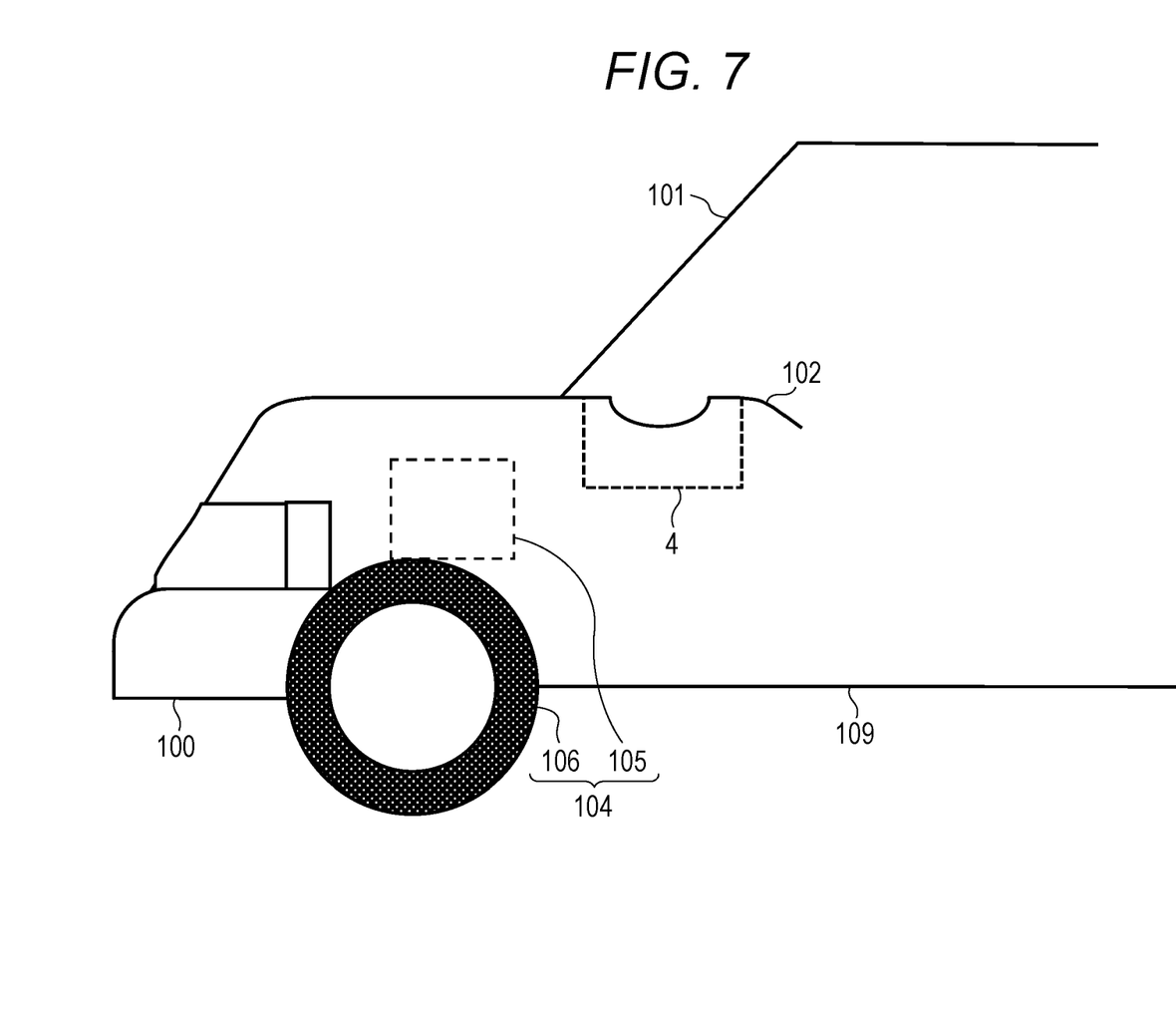
FIG. 7 is a conceptual view from another viewing point of the moving body (vehicle) including the above display system.

In the present exemplary embodiment, as shown in FIGS. 2, 3 and 7, display device 4 is assumed to be a head-up display (HUD) for use in vehicle 100 as a moving body. Hence target space 400 is a space outside a cabin of vehicle 100 and is mainly a space in front of windshield 101 (reflective member, cf. FIG. 2) of vehicle 100.

However, display device 4 is not limited to the head-up display for use in vehicle 100. Display device 4 is also applicable to a display for a moving body other than vehicle 100, such as a motorcycle, a train, an aircraft, a construction machine, and a vessel.

Display device 4 is not limited to the head-up display and may be an augmented reality (AR) display device that augments pieces of information in a real world. Display device 4 may be a side mirror (electronic mirror) of vehicle 100 or a monitor such as an installment panel or a car navigation system installed in the cabin of vehicle 100. When display device 4 is the monitor installed in the cabin, target space 400 may be a space in the cabin of vehicle 100.

In luminance adjustment system 5 of the present exemplary embodiment, controller 50 has at least two modes as operation modes, which are a gradual change mode and an abrupt change mode. The gradual change mode is a mode for changing the luminance of display device 4 with respect to a value of illuminance in target space 400 in a first time. The abrupt change mode is a mode for changing the luminance of display device 4 with respect to the value of illuminance of target space 400 in a second time which is shorter than the first time. Controller 50 takes a sign of an abrupt change in illuminance in target space 400 as a trigger, makes switching from the gradual change mode to the abrupt change mode, and then operates in the abrupt change mode for at least a certain time after the switching.

With this configuration, controller 50 takes the sign of the abrupt change in illuminance in target space 400 as a trigger and makes switching so as to operate in the abrupt change mode as preliminary preparation. That is, the luminance is not simply changed at a high speed after occurrence of an abrupt change in illuminance as in Unexamined Japanese Patent Publication No. 2004-322886, but upon receipt of the "sign" of an abrupt change in illuminance, the operation mode is switched in advance to the abrupt change mode capable of changing the luminance at a high speed at any time. Hence it is possible to further reduce the time required for adjusting the display luminance.

In the present exemplary embodiment, the "sign" of an abrupt change in illuminance is based on illuminance detected by illuminance sensor 56 (FIG. 1) of detector 55, as an example. Specifically, the sign is that an amount of change in illuminance or a rate of change in illuminance exceeds a threshold. Particularly in the present exemplary embodiment, as an example, attention is focused on exit illumination (softening illumination) 601 near an exit in tunnel 6 as shown in FIG. 3. When the "abrupt change in illuminance" corresponds to an abrupt change in luminance of the road surface at the time when vehicle 100 gets outside from the exit of tunnel 6 in the daytime, the "sign" corresponds to a change in illuminance of a vertical plane at the time of shifting from basic illumination to exit illumination 601 in tunnel 6. In other words, controller 50 determines, from the illuminance detected by detector 55, that the illumination has shifted from the basic illumination to exit illumination 601 and makes switching to the abrupt change mode in preparation for the time when the vehicle actually gets outside from the exit of tunnel 6.

It is preferable that luminance adjustment system 5 of the present exemplary embodiment further include detector 55 for detecting illuminance, but detector 55 is not an essential constituent element for luminance adjustment system 5. The sign of the abrupt change in illuminance is not limited to directly detected illuminance, but the current positional information (including a latitude, a longitude, an altitude, etc.) and current time information (including distinction between day and night, etc.). For example, from the outside, luminance adjustment system 5 may acquire, as the sign, information that vehicle 100 has passed a position located 50 m inward from the exit (or the entrance) of tunnel 6.

(2) Details (2.1) Overall Configuration

In the following, display system 1 of the present exemplary embodiment will be described in detail with reference to FIGS. 1 to 7. As described in the above section of "(1) Outline", display system 1 includes display device 4 and luminance adjustment system 5 and is applied, as an example, to vehicle 100 being a moving body. Display device 4 is, as an example, a head-up display used for vehicle 100. Further, in the present exemplary embodiment, as shown in FIG. 3, description will be given focusing on an abrupt change in road-surface luminance at the time when vehicle 100 enters a bright area from a dark area, specifically at the time when vehicle 100 gets outside from exit portion 60 of tunnel 6 in the daytime. Note that FIG. 3 shows an example of one-way traffic in tunnel 6. As shown in FIG. 7, vehicle 100 includes body 109, drive unit 104 that moves the body 109, windshield 101 fixed to body 109, and display device 4 disposed in dashboard 102 of body 109. Drive unit 104 includes drive source 105, such as an engine or a motor, and drive wheels 106 driven by drive source 105.

(2.2) Display Device

Display device 4 is installed in a cabin of vehicle 100 to project an image on windshield 101 of vehicle 100 from below. In an example of FIG. 2, display device 4 is disposed in dashboard 102 below windshield 101. As shown in FIG. 1, display device 4 includes image formation unit 2 and projection optical system 3.

Image formation unit 2 outputs light to form an image. In the present exemplary embodiment, as an example, image formation unit 2 includes, as illustrated in FIG. 1, liquid crystal panel 21 (liquid crystal display: LCD) and light source device 22. Liquid crystal panel 21 is disposed in front of light source device 22. Light source device 22 is used as a backlight for liquid crystal panel 21. Light source device 22 is a so-called surface light source. Light source device 22 is a side light type light source device using a solid light-emitting element, such as a light emitting diode or a laser diode. Light from light source device 22 is transmitted through liquid crystal panel 21 and output from image formation unit 2. Note that the luminance adjusted by (controller 50 of) luminance adjustment system 5 is the luminance of light source device 22.

In image formation unit 2, light source device 22 emits light while an image is displayed on liquid crystal panel 21, and hence the light output forward from light source device 22 is transmitted through liquid crystal panel 21 and output forward from the front surface of liquid crystal panel 21. At this time, the light output forward from the front surface of liquid crystal panel 21 is light reflecting the image displayed on liquid crystal panel 21. As a result, the light forming the image is output from image formation unit 2 as "output light".

Herein, a longitudinal direction of liquid crystal panel 21 represents a longitudinal direction of the projected image, and a lateral direction of liquid crystal panel 21 represents a lateral direction of the projected image. The longitudinal direction of the projected image is a longitudinal direction of virtual image 300 (cf. FIGS. 2 and 3) projected in target space 400 (cf. FIG. 2), namely a direction along a vertical direction in the field of view of user 200 (cf. FIG. 2). The lateral direction of the projected image is a lateral direction of virtual image 300 projected in target space 400, namely a direction along a horizontal direction in the field of view of user 200.

Note that display device 4 may further include a controller (not shown) that controls another operation except adjustment of the luminance of light source device 22 in image formation unit 2. Alternatively, (controller 50 of) luminance adjustment system 5 may also control another operation of image formation unit 2 in addition to adjustment of the luminance of light source device 22.

Projection optical system 3 projects an image by reflecting the output light of image formation unit 2. In the present exemplary embodiment, display device 4 is a head-up display as described above and projects an image on windshield 101 (cf. FIG. 2) which is the reflective member. Projection optical system 3 thus projects an image on a target object made up of windshield 101.

In the present exemplary embodiment, as an example, projection optical system 3 includes first mirror 31 and second mirror 32, as shown in FIG. 1 First mirror 31 and second mirror 32 are disposed in the order of first mirror 31 and second mirror 32 on an optical path of the light output from image formation unit 2. In the present exemplary embodiment, image formation unit 2, first mirror 31, and a second mirror 32 are respectively disposed at apex positions of a triangle formed on a vertical plane. The "vertical plane" mentioned herein means a plane containing the longitudinal direction (vertical direction) of the image formed by image formation unit 2 and an advancing direction (optical axis) of the output light. Projection optical system 3 first reflects the output light of image formation unit 2 on first mirror 31, further reflects the reflected light on second mirror 32, and emits the reflected light to windshield 101.

That is, first mirror 31 is disposed on the opposite side to light source device 22 as seen from liquid crystal panel 21, namely in front of liquid crystal panel 21, such that the output light of image formation unit 2 is incident on first mirror 31. First mirror 31 reflects the output light of image formation unit 2 toward second mirror 32. Second mirror 32 is disposed in such a position that the output light of image formation unit 2, reflected on first mirror 31, is incident on second mirror 32. Second mirror 32 reflects the output light of image formation unit 2, reflected on first mirror 31, from opening 103 (cf. FIG. 2) of dashboard 102 toward windshield 101. In the present exemplary embodiment, first mirror 31 is a convex mirror, and second mirror 32 is a concave mirror.

With the configuration formed as described above, projection optical system 3 projects the image, formed in image formation unit 2, with an appropriate size as a projection image on windshield 101 which is a target object, to project virtual image 300 in target space 400. The "virtual image" mentioned herein means an image formed by diverging light rays as if an object were actually present when the light emitted from display device 4 is diverged by a reflector such as windshield 101.

In display device 4, virtual image 300 formed in target space 400 is formed on virtual plane 501 that intersects with optical axis 500 of display device 4 as shown in FIG. 2. In the present exemplary embodiment, optical axis 500 is along road surface 600 in front of vehicle 100 in target space 400 in front of vehicle 100. Virtual plane 501 on which virtual image 300 is formed is substantially vertical to road surface 600. For example, when road surface 600 is a horizontal plane, virtual image 300 is displayed along a vertical plane.

Therefore, as shown in FIG. 3, user 200 who is driving vehicle 100 can see virtual image 300 which is projected by display device 4 while being superimposed on a real space spreading in front of vehicle 100. Hence, display device 4 can display, as virtual image 300, various pieces of driving assistance information such as vehicle speed information, navigation information, pedestrian information, front vehicle information, lane departure information, and vehicle condition information. Display device 4 then enables user 200 to visually recognize the various pieces of driving assistance information. In FIG. 3, virtual image 300 is vehicle speed information, indicating information of "50 km/h" as an example. Accordingly, user 200 can visually acquire the driving assistance information only by slightly moving his or her line of sight from the state of being directed to the front of windshield 101.

(2.3) Luminance Adjustment System

Luminance adjustment system 5 is a system for adjusting the luminance of the image display in display device 4. In the present exemplary embodiment, luminance adjustment system 5 adjusts brightness (luminance) of light output from light source device 22 which is a backlight of liquid crystal panel 21 in display device 4. Luminance adjustment system 5 includes controller 50 and detector 55 as shown in FIG. 1.

Detector 55 is configured to detect illuminance in target space 400 and transmit the detected illuminance to controller

50. Target space 400 is a space including an area in which an image of display device 4 is formed. In the present exemplary embodiment, target space 400 is a space including virtual image 300 on virtual plane 501 outside the cabin of vehicle 100. Therefore, in the following, "the illuminance in target space 400" is assumed to be the vertical-plane illuminance (lx) in tunnel 6 rather than the road-surface luminance (cd/m$^2$) of road surface 600 in tunnel 6, but this is not particularly restrictive.

As shown in FIG. 1, detector 55 includes illuminance sensor 56, amplifier 57, and analog-to-digital (AD) converter 58.

Illuminance sensor 56 is made up of, for example, a photo integrated circuit (IC) that detects the illuminance (brightness) of target space 400 and is disposed near opening 103 in dashboard 102 of vehicle 100. Illuminance sensor 56 outputs to amplifier 57 an illuminance voltage (analog signal) according to the illuminance of target space 400. Amplifier 57 amplifies the signal input from illuminance sensor 56 and outputs the amplified signal to AD converter 58. AD converter 58 converts the output signal of amplifier 57 to a digital signal and transmits the converted signal to controller 50 as a value of illuminance (detected value).

Controller 50 is configured to change luminance of light output from light source device 22 in accordance with the value of illuminance in target space 400, namely, the detected value from detector 55. Controller 50 is configured of a microcomputer mainly made up of, for example, a central processing unit (CPU) and a memory. In other words, controller 50 is achieved by a computer including the CPU and the memory. By the CPU executing a program stored in the memory, the computer functions as controller 50. Herein, the program is recorded into the memory of controller in advance. However, the program may be provided via a telecommunication line such as the Internet or by being recorded in a recording medium such as a memory card.

As shown in FIG. 1, controller 50 includes processor 51, input unit 52, output unit 53, and storage 54. Note that storage 54 may be the above memory or may be provided separately from the above memory.

Input unit 52 is electrically connected to an output terminal of AD converter 58 in detector 55 via signal line S1 (cf. FIG. 1). Input unit 52 is configured to receive the detected value of illuminance from detector 55. Output unit 53 is electrically connected to a lighting circuit that performs lighting control of the light source in light source device 22 via a signal line S2 (cf. FIG. 1). Output unit 53 is configured to output a control signal generated in processor 51 to the lighting circuit of light source device 22. In light source device 22, upon receipt of the control signal, the lighting circuit changes a light output of the light source so as to have luminance according to the control signal.

Processor 51, for example, calculates actual illuminance (lx) and luminance (cd/m$^2$) and the like of target space 400 from the detected value of illuminance (the voltage value corresponding to the illuminance) acquired from detector 55. Alternatively, processor 51 may be configured to receive numerical data of illuminance (lx) and luminance (cd/m$^2$) already calculated from the voltage value on detector 55 side. In the following, the calculated illuminance (lx) and luminance (cd/m$^2$) are also referred to simply as "detected values of illuminance". However, for example, the calculated luminance (cd/m$^2$) may be appropriately used for determination processing in comparison with a threshold or a reference value, or the detected value acquired from detector 55 may be used as it is for the determination processing in the comparison.

Storage 54 is a data-rewritable memory and is preferably a nonvolatile memory. Storage 54 stores various pieces of data (histories of detected values, threshold, reference value, etc.) used in processor 51.

Processor 51 of the present exemplary embodiment herein has at least two modes as operation modes, which are a gradual change mode and an abrupt change mode. The gradual change mode is a mode for changing the luminance of display device 4 with respect to the detected value of illuminance in a first time (e.g., two seconds). The abrupt change mode is a mode for changing the luminance of display device 4 with respect to the detected value of illuminance in a second time (e.g., 0.5 seconds) which is shorter than the first time. Processor 51 takes the sign of the abrupt change in illuminance in target space 400 as a trigger, makes switching from the gradual change mode to the abrupt change mode, and then operates in the abrupt change mode for at least a certain time (e.g., five seconds) after the switching.

As described in the above section of "(1) Outline", the sign herein is that an amount of change in illuminance or a rate of change in illuminance exceeds a threshold as an example. Particularly in the present exemplary embodiment, attention is focused on exit illumination 601 (cf. FIG. 3) near exit portion 60 in tunnel 6.

In the daytime, when vehicle 100 travels in tunnel 6 and approaches the vicinity of the exit of tunnel 6, a phenomenon occurs in which the exit opening appears very bright to user 200. For preventing this phenomenon, exit illumination 601 is installed on a ceiling at exit portion 60 in tunnel 6 or on a side wall portion near the ceiling. In the present exemplary embodiment, when the "abrupt change in illuminance" corresponds to an abrupt change in road-surface luminance when vehicle 100 gets outside from the exit of tunnel 6 in the daytime, the "sign" corresponds to a change in vertical-plane illuminance at the time of shifting from basic illumination to exit illumination 601 in tunnel 6. That is, processor 51 determines, from the detected value of illuminance, that the illumination has shifted from the basic illumination to exit illumination 601 and makes switching to the abrupt change mode in preparation for the time when the vehicle actually gets outside from the exit of tunnel 6.

(2.4) Gradual Change Mode

Figure 4:
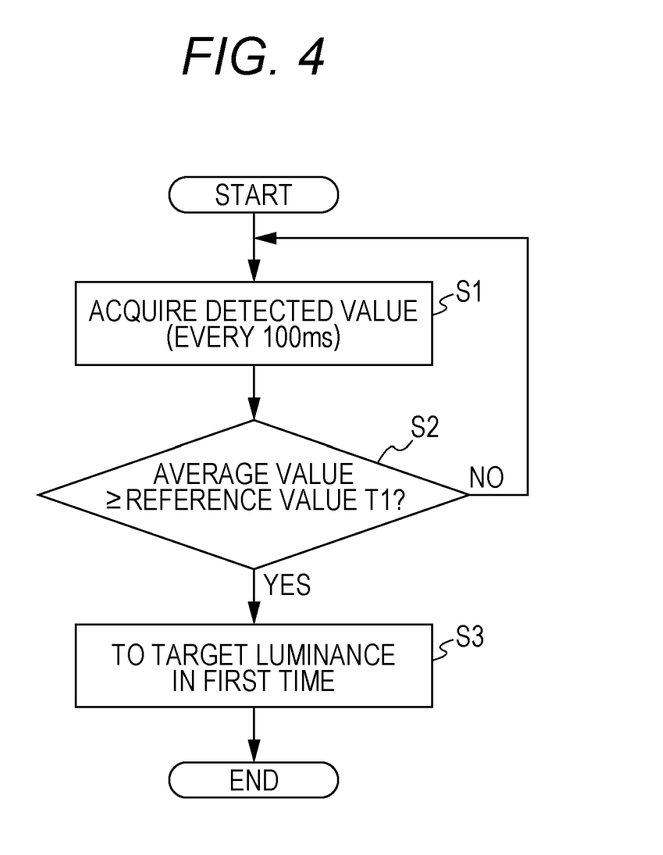
FIG. 4 is a flowchart for explaining a gradual change mode in a luminance adjustment system according to an exemplary embodiment.

In the following, the gradual change mode, one of the operation modes of processor 51 will be described with reference to a flowchart of FIG. 4. The gradual change mode is a basic operation mode in processor 51. In the gradual change mode, processor 51 acquires a detected value of illuminance from detector 55 through input unit 52 every 100 ms (step S1).

Processor 51, for example, calculates an average value of a detected value newly acquired this time and detected values for the past two times acquired immediately before (detected values for three times in total) and compares the average value and reference value T1 stored in storage 54 (step S2). Herein, data in which average values of illuminance are associated with target luminance is stored into storage 54 in advance. When the calculated average value of illuminance is equal to or larger than reference value T1 (step S2: YES), processor 51 refers to storage 54 to determine target luminance corresponding to the average value of illuminance. Processor 51 then outputs a control signal from output unit 53 in the first time (e.g., two seconds) such that the current luminance of display device 4 reaches the target luminance (step S3). When the calculated average value of illuminance is smaller than reference value T1 (step S2: NO), processor 51 returns to step S1.

During a period until the first time elapses, processor 51 divides, for example, 2000 ms being the first time into 20 sections and performs control just for the first 100 ms so as to increase the current luminance to luminance of about 7%, a little larger than 5%, among the target luminance. In short, processor 51 promptly increases the luminance just for the first 100 ms within the first time. Subsequently, processor 51 performs control so as to monotonously increase the luminance of display device 4 toward the target luminance until the first time elapses. That is, processor 51 performs substantially linear increase control on the luminance of display device 4 such that the increase slightly becomes convex upward overall within the first time.

(2.5) Abrupt Change Mode

In the following, the abrupt change mode, the other of the operation modes of processor 51 will be described with reference to a flowchart of FIG. 5. The abrupt change mode is a mode that is switched by taking the sign of the change in illuminance as a trigger during operation in the gradual change mode which is the basic operation mode. In the present exemplary embodiment, as described above, the sign is a change in vertical-plane illuminance at the time of shifting from the basic illumination to exit illumination 601 in tunnel 6.

Herein, before determination of the presence or absence of the sign, a condition (first condition or second condition) of whether or not to execute the switching to the gradual change mode is provided. When the first condition or the second condition is satisfied, processor 51 takes the presence of the sign as a trigger and executes the switching from the gradual change mode to the abrupt change mode. The first condition is that the detected value is equal to or smaller than a first threshold. The first condition is mainly a condition corresponding to entry from a dark area to a bright area. In the present exemplary embodiment, with attention focused on the illumination in tunnel 6, the first threshold is set to, for example, 100 cd/m$^2$ which is slightly higher than the road-surface luminance in the tunnel, but the setting is not particularly limited.

The second condition is that the detected value is larger than a second threshold which is larger than the first threshold. The second condition is a condition corresponding to entry from the bright area to the dark area. In the present exemplary embodiment, with attention focused on the illumination in tunnel 6, the second threshold is appropriately set to, for example, outside luminance from 1000 cd/m$^2$ to 10000 cd/m$^2$ inclusive, but the setting is not particularly limited.

By the settings of the first and second conditions, it is possible to prevent a situation in which the switching to the abrupt change mode is frequently executed following a change in illuminance in an unintentional range, such as flickering due to sunlight filtering through trees. In the present exemplary embodiment, with attention focused especially on the exit illumination of the illumination in tunnel 6, steps only in the first condition are illustrated in FIG. 5, and illustration of steps in the second condition is omitted.

Figure 5:
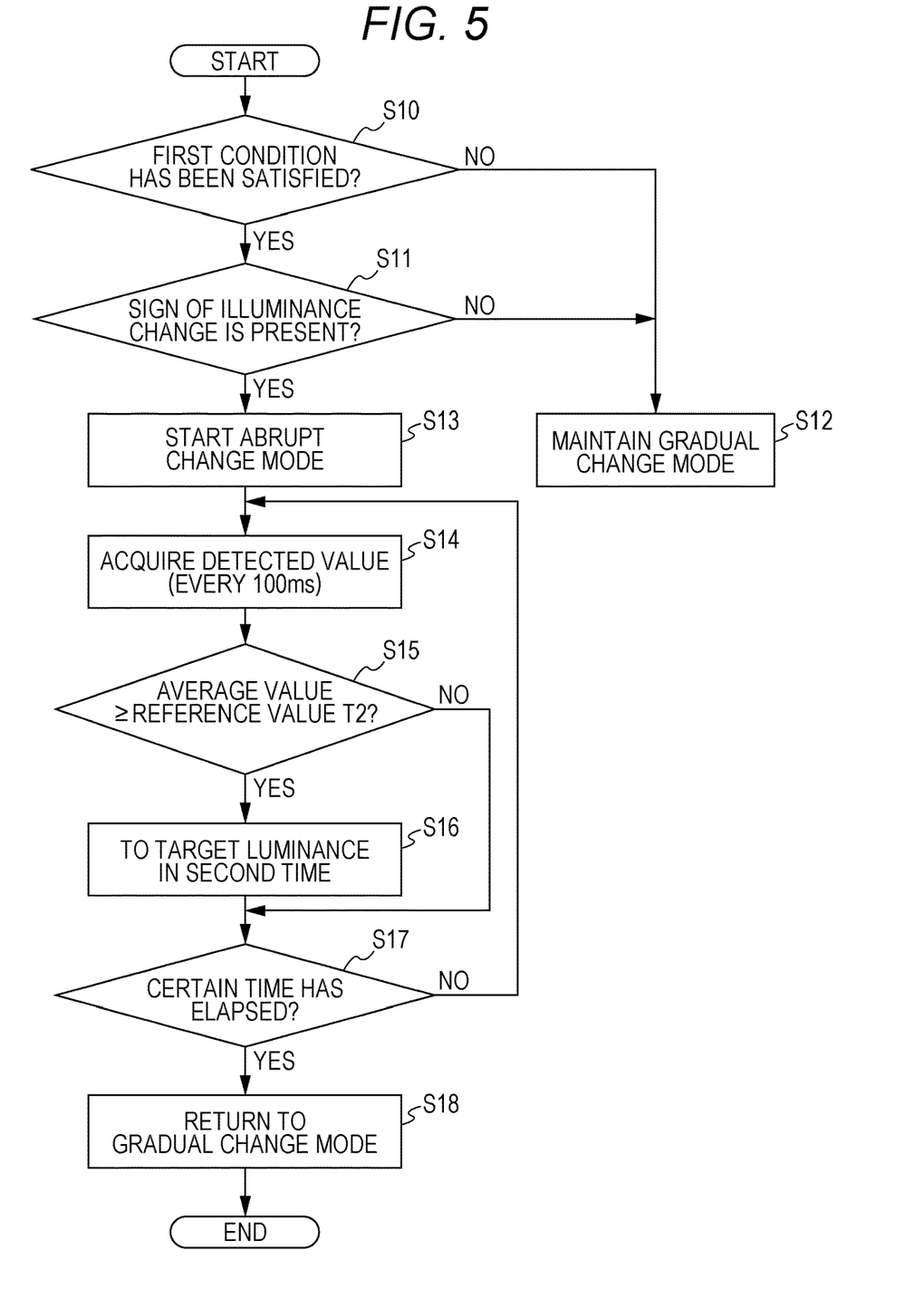
FIG. 5 is a flowchart for explaining an abrupt change mode in the above luminance adjustment system.

First, as shown in FIG. 5, processor 51 determines whether or not the first condition has been satisfied in a certain cycle (e.g., every one second) during operation in the gradual change mode (step S10). In the present exemplary embodiment, when vehicle 100 enters tunnel 6, the first condition is naturally satisfied. When the first condition has been satisfied (step S10: YES), the presence or absence of the sign of the abrupt change in illuminance is determined, namely, the presence or absence of the change in illuminance (vertical-plane illuminance) at the time of shifting from the basic illumination to exit illumination 601 in tunnel 6 is determined (step S11). On the other hand, when the first condition is not satisfied (step S10: NO), processor 51 maintains the gradual change mode (step S12).

In step S11, processor 51 determines whether or not an amount of change in illuminance (or a rate of change in illuminance) exceeds a threshold (hereinafter referred to as third threshold). When the amount of change in illuminance (or the rate of change in illuminance) exceeds the third threshold (step S11: YES), processor 51 switches the operation mode from the gradual change mode to the abrupt change mode. As a result, the abrupt change mode is started (step S13). On the other hand, when the amount of change in illuminance (or the rate of change in illuminance) does not exceed the third threshold (step S11: NO), processor 51 maintains the gradual change mode (step S12).

The amount of change in illuminance is, for example, a difference between a detected value newly obtained in input unit 52 this time and a detected value acquired in input unit 52 last time. In this case, the third threshold is set based on a difference between the basic illumination and the luminance of exit illumination 601. Instead of the amount of change in illuminance, the rate of change in illuminance may be used for determination. The rate of change in illuminance is, for example, a value obtained by dividing the detected value newly acquired in input unit 52 this time by the detected value acquired in input unit 52 last time. In this case, the third threshold is set based on a luminance ratio of the basic illumination and exit illumination 601.

In the abrupt change mode, processor 51 acquires a detected value of illuminance from detector 55 through input unit 52 every 100 ms (step S14). That is, a cycle in which the detected value of illuminance is acquired from detector 55 is the same between the abrupt change mode and the gradual change mode (cf. step S1 in FIG. 4). However, the cycle in which the detected value of illuminance is acquired may be different between the abrupt change mode and the gradual change mode.

Processor 51 compares the detected value for one time, newly acquired this time, and reference value T2 stored in storage 54 (step S15). Herein, data in which detected values of illuminance are associated with target luminance is stored into storage 54 in advance. When the detected value of illuminance is equal to or larger than reference value T2 (step S15: YES), processor 51 refers to storage 54 to determine target luminance corresponding to the detected value of illuminance. Processor 51 then outputs a control signal from output unit 53 in the second time (e.g., 0.5 seconds) such that the current luminance of display device 4 reaches the target luminance (step S16).

That is, instead of obtaining an average value of detected values for several times (e.g., three times) as in the gradual change mode, processor 51 performs comparison and determination only using a detected value for one time, newly acquired this time. In other words, processor 51 is configured to reduce a period, that is required until the target luminance is determined, in the abrupt change mode more as compared to in the gradual change mode.

Further, processor 51 determines whether or not a certain time (e.g., five seconds) has elapsed from the start of the abrupt change mode by using a timer (counter) built in processor 51 (step S17), and maintains the abrupt change mode until the certain time elapses (step S17: NO). When the certain time elapses (step S17: YES), processor 51 returns the operation mode from the abrupt change mode to the gradual change mode (step S18). When the detected value of illuminance is smaller than reference value T2 (step S15: NO), processor 51 skips step S16 and moves to step S17.

During a period until the second time elapses in step S16, processor 51 divides, for example, 500 ms being the second time into five sections and performs control just for the first 100 ms so as to increase the current luminance to luminance of about 30%, larger than 20%, among the target luminance. Subsequently, processor 51 performs control so as to constantly increase the luminance of display device 4 toward the luminance of 30% as the remaining target luminance until the second time elapses. That is, processor 51 performs rapid increase control on the luminance of display device 4 such that the increase draws an exponential curve overall within the second time.

(2.6) Exit Illumination

Figure 6:
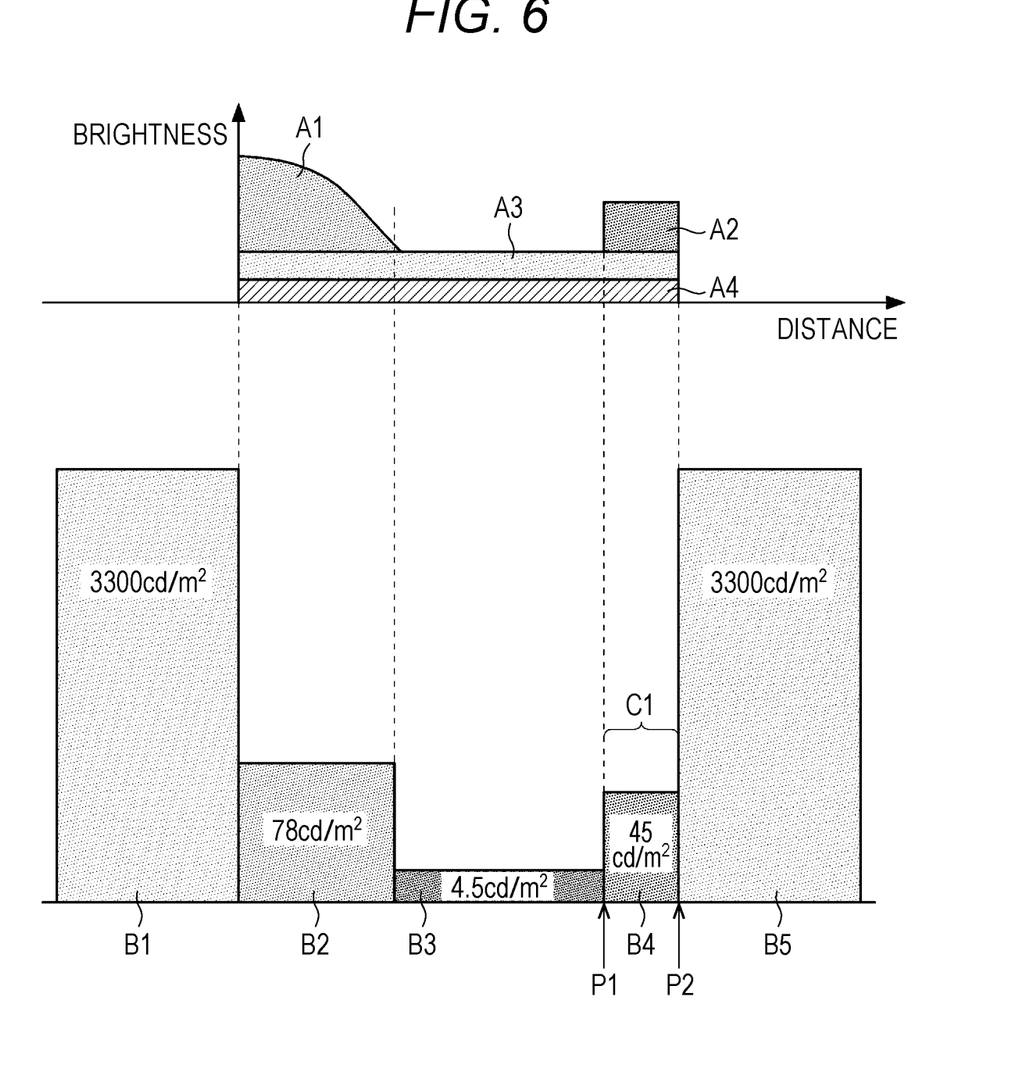
FIG. 6 is an explanatory diagram for explaining relationship between the gradual change mode and the abrupt change mode in the above luminance adjustment system and exit illumination in the tunnel.

In the following, relationship between the two operation modes of processor 51 described above and exit illumination 601 will be described in detail with reference to FIG. 6. In the upper part of FIG. 6, a horizontal axis denotes a distance in tunnel 6 and a vertical axis denotes brightness (lx) in tunnel 6. In this example, the left side of FIG. 6 corresponds to the entrance side of tunnel 6, and the right side of FIG. 6 corresponds to the exit side of tunnel 6. In the upper part of FIG. 6, area A1 shows brightness due to entrance illumination, and area A2 shows brightness due to exit illumination 601. Further, in the upper part of FIG. 6, area A3 shows brightness due to basic illumination, and area A4 shows brightness due to illumination during a power failure. In this manner, a softening period is provided on the entrance side and the exit side in tunnel 6. Since FIG. 3 shows the example of one-way traffic in tunnel 6, area A1 on the entrance side is brighter than area A2 on the exit side. However, in the case of oncoming traffic, the brightness of area A1 and the brightness of area A2 are set to be the same.

Meanwhile, the lower part of FIG. 6 shows the luminance (cd/m$^2$) with respect to the brightness (lx) in the upper part of FIG. 6. In the lower part of FIG. 6, areas B1 and B5 show outside luminance. Area B2 shows road-surface luminance corresponding to the entrance illumination, area B3 shows road-surface luminance corresponding to the basic illumination, and area B4 shows road-surface luminance corresponding to exit illumination 601. In the lower part of FIG. 6, a real value of luminance in each area is given so as to facilitate understanding of the operation modes in processor 51, but this is merely an example. These real values are appropriately determined in accordance with a structure of the tunnel (e.g. a length of the tunnel), an environment near the tunnel, traffic situations, etc.

Herein, for example, when the outside luminance in the daytime is 3300 cd/m$^2$ as in FIG. 6, the vertical-plane illuminance due to exit illumination 601 is set to about 400 lx which is 12% of the outside luminance.

In the present exemplary embodiment, it is aimed that processor 51 makes switching from the gradual change mode to the abrupt change mode at a position as close to start point P1 of area B4 as possible within range C1 from start point P1 to end point P2 of area B4 which almost corresponds to exit illumination 601. In other words, in preparation for occurrence of the abrupt change in illuminance near end point P2, processor 51 determines as the "sign" a change in vertical-plane illuminance which occurs at the time of shifting from the basic illumination to exit illumination 601. The illuminance increases, for example, about ten times from 40 lx to 400 lx near start point P1, and increases about ten thousand times from 400 lx near end point P2. Processor 51 detects the change from 40 lx to 400 lx in step S11 in FIG. 5 described above and executes the switching to the abrupt change mode.

In this manner, luminance adjustment system 5 of the present exemplary embodiment makes preparation in the abrupt change mode within range C1 in tunnel 6, so that when an abrupt change in illuminance actually occurs, luminance adjustment system 5 can promptly determine the target luminance and adjust the luminance.

For example, in the case of there being no preparation in the abrupt change mode, when, after occurrence of the abrupt change in illuminance, the target luminance is determined and rapid luminance increase control is then performed, it takes about two seconds to determine the target luminance because comparison processing is performed after calculation of an average value of detected values for three times. On the other hand, in luminance adjustment system 5 of the present exemplary embodiment, the determination on the first condition of whether or not to make switching from the gradual change mode to the abrupt change mode is performed in a cycle of one second, for example (step S10 of FIG. 5). Further, the comparison processing is performed from a detected value that is acquired every 100 ms without obtaining an average value. Therefore, in luminance adjustment system 5, about 1.1 seconds is required from the switching of the gradual change mode to the abrupt change mode to the determination of the target luminance, and the time required is thus reduced by about one second as compared to the case of there being no preparation in the abrupt change mode.

This reduction by about one second seems just a little. However, in general, adaptation of the human eyeball in the case of entering from a dark area to a bright area (light adaptation) is physiologically much faster as compared to the adaption in the case of entering from the bright area to the dark area (dark adaptation). The time required for the dark adaptation, namely, the time required for the human eyes to get used to darkness at the time of entry into the dark area, is said to be five minutes to 30 minutes, whereas the time required for the light adaptation, namely, the time required for the human eyes to get used to brightness at the time of entry into the bright area, is said to be about 0.5 seconds. Therefore, when the time is reduced by about one second by performing the operation in the abrupt change mode near the exit in tunnel 6, it is possible to achieve adjustment of the luminance at such a speed as to be able to follow the light adaptation of the human eyes which is very fast. Consequently, concerning the change in luminance of the image display of display device 4, it is possible to eliminate the sense of discomfort which is given to the eyes of user 200 when vehicle 100 gets out of the exit of tunnel 6.

(3) Modifications

In the following, some modifications will be enumerated. The exemplary embodiment described above will be referred to as "basic example" below.

In the basic example, the change in illuminance has been the increase in illuminance due to the focus of attention on exit illumination 601 in tunnel 6 in the daytime. However, the change in illuminance may be a decrease in illuminance. For example, the abrupt change mode in luminance adjustment system 5 may be applied to the entrance of tunnel 6. In this case, the "sign" of the change in illuminance may not be obtained directly from the illuminance but may be obtained from, for example, positional information (50 m inward from the entrance of tunnel 6), current time information (information in which day and night can be distinguished), weather information (information in which sunny, cloudy, and rainy weather can be distinguished), or the like. The positional information may be acquired from a potable terminal such as a smart phone or a global positioning system (GPS) such as a car navigation system.

The information on the sign may be acquired from a so-called vehicle to X (V2X) (vehicle-to-vehicle communication, road-to-vehicle communication). That is, luminance adjustment system 5 may acquire the information on the sign from a vehicle traveling in front by wireless communication (vehicle-to-vehicle communication: V2V) or from a traffic light, a road sign, or the like by wireless communication.

In the basic example, the abrupt change in illuminance has been the change that occurs when vehicle 100 gets outside from the exit in tunnel 6 in the daytime. However, the abrupt change in illuminance may be a change in illuminance that occurs when the vehicle gets out of a place other than tunnel 6, for example, an underground parking lot, in the daytime. When the moving body is an aircraft, the abrupt change in illuminance may be a change in illuminance that occurs when the aircraft gets out of layers of thick clouds by increasing the altitude.

In the basic example, the case in which vehicle 100 travels between the bright area and the dark area has been assumed. However, application is possible to, for example, a case where vehicle 100 is being stopped in front of a shutter of a parking lot and the illuminance in target space 400 changes by opening operation or closing operation of the shutter. In this case, the sign may be the start of the opening operation or the closing operation of the shutter.

In the basic example, the operation modes in controller 50 are just two modes, the gradual change mode and the abrupt change mode. However, in addition to the gradual change mode and the abrupt change mode, controller 50 may have an ultra-abrupt change mode for, as compared to the abrupt change mode, further reducing the time that is required until the target luminance is determined, and further increasing the speed at which the current luminance is increased toward the determined target luminance. In short, controller 50 may have three operation modes or more.

A similar function to that of luminance adjustment system 5 (mainly controller 50) in the basic example may be embodied by a computer program, a non-transitory recording medium in which a program is recorded, or the like. Herein, a main entity for executing luminance adjustment system 5 includes a computer system. The computer system is mainly made up of a processor as hardware and a memory. By the processor executing a program recorded in the memory of the computer system, the function of luminance adjustment system 5 as the execution entity is achieved. The program may be recorded into the memory of the computer system in advance but may be provided through a telecommunication line or may be provided in the state of being recorded in a recording medium such as a memory card, an optical disk, or a hard disk drive. The processor of the computer system is made up of one or a plurality of electronic circuits including an integrated circuit (IC) or a large-scale integration (LSI). The plurality of electronic circuits may be integrated into one chip or may be dispersed and provided in a plurality of chips. The plurality of chips may be integrated into one device or may be dispersed and provided in a plurality of devices.

Further, controller 50 of luminance adjustment system 5 in the basic example has been achieved by one device but is not limited to this configuration. For example, at least one function of the functions of processor 51, input unit 52, output unit 53, and storage 54 in controller 50 of luminance adjustment system 5 may be dispersed and provided in two devices or more. Similarly, at least one function of the functions of illuminance sensor 56, amplifier 57, and AD converter 58 in detector 55 of luminance adjustment system 5 may be dispersed and provided in two devices or more. At least some of the functions of luminance adjustment system 5 may be achieved by a cloud (cloud computing), for example.

(4) Advantages

As described above, a luminance adjustment system (5) according to a first aspect adjusts luminance of image display in a display device (4). The luminance adjustment system (5) includes a controller (50) that changes the luminance in accordance with a value of illuminance in a target space (400). The controller (50) includes, as operation modes, a gradual change mode in which the luminance with respect to the value of illuminance is changed in a first time, and an abrupt change mode in which the luminance with respect to the value of illuminance is changed in a second time being shorter than the first time. The controller (50) makes switching from the gradual change mode to the abrupt change mode with a sign of an abrupt change in illuminance in the target space (400) taken as a trigger, and then operates in the abrupt change mode for at least a fixed time after the switching. According to the first aspect, it is possible to further reduce the time required for adjusting the display luminance.

Concerning a luminance adjustment system (5) according to a second aspect, in the first aspect, the sign of the abrupt change in illuminance is preferably that an amount of change in illuminance or a rate of change in illuminance exceeds a threshold. According to the second aspect, as compared to a case where the sign is current positional information indicating the vicinity of the entrance or the exit of the tunnel (6), current time information, or the like, it is possible to more accurately make switching from the gradual change mode to the abrupt change mode.

Concerning a luminance adjustment system (5) according to a third aspect, in the first or second aspect, the controller (50) is preferably configured to shorten a time required to determine target luminance for adjusting the luminance, in the abrupt change mode as compared to in the gradual change mode. According to the third aspect, it is possible to facilitate reduction in time required for adjusting the display luminance.

Concerning a luminance adjustment system (5) according to a fourth aspect, in any of the first to third aspects, the change in illuminance in the abrupt change in illuminance preferably is an increase in the illuminance. It is preferable that the controller (50) makes switching from the gradual change mode to the abrupt change mode only with a sign of the increase in the illuminance taken as a trigger. According to the fourth aspect, when the illuminance of target space (400) increases as in an area near the exit in the tunnel (6), it is possible to further reduce the time required for adjusting the display luminance. Particularly, in general, adaptation of the human eyeball in the case of entry from a dark area to a bright area (light adaptation) is physiological much faster as compared to the adaption in the case of entry from the bright area to the dark area (dark adaptation) (while the dark adaptation takes five minutes to 30 minutes, the light adaptation takes about 0.5 seconds). In contrast, the operation is performed in the abrupt change mode near the exit in the tunnel (6), so that it is possible to achieve adjustment of the luminance at such a speed as to be able to follow the light adaptation of the human eyes which is very fast. Therefore, concerning the change in luminance of the image display of the display device (4), it is possible to eliminate the sense of discomfort which is given to the human eyes.

Concerning a luminance adjustment system (5) according to a fifth aspect, in any of the first to fourth aspects, when the first condition or the second condition is satisfied, the controller (50) preferably executes the switching from the gradual change mode and the abrupt change mode with the sign taken as a trigger. The first condition is preferably that the value of illuminance is equal to or smaller than a first threshold, and the second condition is preferably that the value of illuminance is equal to or larger than a second threshold which is larger than the first threshold. According to the fifth aspect, for example, as compared to a case where the first condition or the second condition is not set, it is possible to prevent a situation in which the switching to the abrupt change mode is frequently executed following a change in illuminance in an unintentional range.

Concerning a luminance adjustment system (5) according to a sixth aspect, in any of the first to fifth aspects, when the fixed time elapses in the abrupt change mode, the controller (50) preferably makes switching back to the gradual change mode. According to the sixth aspect, it is possible to prevent a situation in which the abrupt change mode continues for a long time although the vehicle (100) has passed through the exit of the tunnel.

Concerning a luminance adjustment system (5) according to a seventh aspect, in any of the first to sixth aspects, it is preferable that the luminance adjustment system (5) further include a detector (55) that detects the illuminance in the target space (400) and transmit the detected illuminance to the controller (50). According to the seventh aspect, it is possible to more accurately make switching from the gradual change mode to the abrupt change mode.

A display system (1) according to an eighth aspect includes the luminance adjustment system (5) in any one of the first to seventh aspects, and a display device (4). According to the eighth aspect, it is possible to provide the display system (1) capable of further reducing the time required for adjusting the display luminance.

A moving body (e.g., vehicle 100) according to a ninth aspect includes: the display system (1) in the eighth aspect; and a reflective member (e.g., windshield 101) caused to project an image of the display device (4). According to the ninth aspect, it is possible to provide the moving body capable of further reducing the time required for adjusting the display luminance.

A luminance adjustment method according to a tenth aspect adjusts luminance of image display in a display device (4). The luminance adjustment method includes changing the luminance of the image display in accordance with a value of illuminance in a target space (400). In the changing, operation modes include a gradual change mode in which the luminance with respect to the value of illuminance is changed in a first time, and an abrupt change mode in which the luminance with respect to the value of illuminance is changed in a second time being shorter than the first time. In the changing, with a sign of an abrupt change in illuminance in the target space (400) taken as a trigger, switching is made from the gradual change mode to the abrupt change mode, and operation is then performed in the abrupt change mode for at least a fixed time after the switching. According to the tenth aspect, it is possible to provide a method capable of further reducing the time required for adjusting the display luminance.

The present disclosure relates to a luminance adjustment technique and is particularly useful as a luminance adjustment system for adjusting luminance of image display in a display device, a display system including the luminance adjustment system and the display device, a moving body including the display system, and a luminance adjustment method.

What is claimed is:

1. A virtual image display system configured to project a virtual image on a windshield, the virtual image display system comprising:
    a display device including an image formation circuit, the image formation circuit configured to
        form the virtual image to be projected onto the windshield separate from the display device, and
        emit a light beam towards a target space to project the virtual image onto the windshield, the target space being a space where the virtual image is projected;
    a luminance adjustment system configured to adjust luminance of the virtual image being projected on the windshield, the luminance adjustment system comprising a controller configured to change the luminance of the virtual image in accordance with a change, with respect to time, in an amount of illuminance in the target space, and a space that is peripheral to the target space,
    wherein
    the controller has, as operation modes,
    a gradual change mode in which the luminance with respect to the amount of illuminance is changed in a first time, and
    an abrupt change mode in which the luminance with respect to the amount of illuminance is changed in a second time being shorter than the first time, and
    the controller makes switching from the gradual change mode to the abrupt change mode with a sign of an abrupt change in the amount of illuminance with respect to time taken as a trigger, and then operates in the abrupt change mode for at least a fixed time after the switching.

2. The virtual image display system according to claim 1, wherein the sign of the abrupt change in the amount of illuminance is that the amount of change, with respect to time, in the illuminance exceeds a threshold.

3. The virtual image display system according to claim 1, wherein the controller is configured to shorten a time required to determine target luminance for adjusting the luminance of the virtual image, in the abrupt change mode as compared to in the gradual change mode.

4. The virtual image display system according to claim 1, wherein
    the change in the amount of illuminance in the abrupt change in illuminance is an increase in the amount of illuminance with respect to time, and
    the controller makes switching from the gradual change mode to the abrupt change mode only with a sign of the increase in the amount of illuminance with respect to time taken as a trigger.

5. The virtual image display system according to claim 1, wherein, when a first condition that the change in the amount of illuminance with respect to time is equal to or smaller than a first threshold or a second condition that the change in the amount of illuminance with respect to time is equal to or larger than a second threshold being larger than the first threshold is satisfied, the controller executes switching from the gradual change mode and the abrupt change mode with the sign taken as a trigger.

6. The virtual image display system according to claim 1, wherein when the fixed time elapses in the abrupt change mode, the controller makes switching back to the gradual change mode.

7. The virtual image display system according to claim 1, further comprising
a detector that
detects the amount of illuminance in the target space and the space that is peripheral to the target space, and
transmits the detected amount of illuminance to the controller.

8. A moving body comprising:
a body;
the virtual image display system according to claim 1, mounted in the body,
wherein the windshield is fixed to the body, and the virtual image display system is caused to project the virtual image projected onto the windshield by the display device; and
a drive unit that moves the body.

9. A virtual image display method for projecting a virtual image on a windshield, the virtual image display method comprising:
forming, by a display device, the virtual image to be projected onto the windshield that is separate from the display device,
emitting, by the display device, a light beam towards a target space to project the virtual image onto the windshield, the target space being a space where the virtual image is projected;
adjusting luminance of the virtual image being projected on the windshield, wherein the adjusting of the luminance of the virtual image includes changing the luminance of the virtual image in accordance with a change in, with respect to time, an amount of illuminance in the target space and a space that is peripheral to the target space,
wherein
in the changing, operation modes include
a gradual change mode in which the luminance with respect to the amount of illuminance is changed in a first time, and
an abrupt change mode in which the luminance with respect to the amount of illuminance is changed in a second time being shorter than the first time, and
in the changing, with a sign of an abrupt change in the amount of illuminance with respect to time taken as a trigger, switching is made from the gradual change mode to the abrupt change mode, and operation is then performed in the abrupt change mode for at least a fixed time after the switching.

* * * * *